US011996605B2

(12) United States Patent
Uejima

(10) Patent No.: US 11,996,605 B2
(45) Date of Patent: May 28, 2024

(54) ANTENNA DEVICE AND VEHICLE

(71) Applicant: Panasonic Intellectual Property Management Co., Ltd., Osaka (JP)

(72) Inventor: Hiroyuki Uejima, Ishikawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 173 days.

(21) Appl. No.: 17/765,805

(22) PCT Filed: Sep. 28, 2020

(86) PCT No.: PCT/JP2020/036671
§ 371 (c)(1),
(2) Date: Mar. 31, 2022

(87) PCT Pub. No.: WO2021/065818
PCT Pub. Date: Apr. 8, 2021

(65) Prior Publication Data

US 2022/0328951 A1 Oct. 13, 2022

(30) Foreign Application Priority Data

Oct. 2, 2019 (JP) ................................ 2019-182438

(51) Int. Cl.
*H01Q 1/22* (2006.01)
*H01Q 13/08* (2006.01)
*H01Q 19/02* (2006.01)
*H01Q 21/26* (2006.01)

(52) U.S. Cl.
CPC ............... *H01Q 1/22* (2013.01); *H01Q 13/08* (2013.01); *H01Q 19/02* (2013.01); *H01Q 21/26* (2013.01)

(58) Field of Classification Search
CPC .......... H01Q 1/22; H01Q 13/08; H01Q 19/02; H01Q 21/26; H01Q 9/0407; H01Q 19/22; H01Q 21/065; H01Q 21/29; H01Q 1/3275; H01Q 1/32
See application file for complete search history.

(56) References Cited

U.S. PATENT DOCUMENTS

2006/0244663 A1 11/2006 Fleck et al.
2015/0214629 A1 7/2015 Hagiwara et al.
2020/0292654 A1 9/2020 Kumagai
(Continued)

FOREIGN PATENT DOCUMENTS

CN 109346829 A 2/2019
JP 2000-353914 A 12/2000
(Continued)

OTHER PUBLICATIONS

Extended European Search Report, dated Oct. 11, 2022, for European Application No. 20872048.2-1205, 11 pages.
(Continued)

*Primary Examiner* — Daniel D Chang
(74) *Attorney, Agent, or Firm* — Seed IP Law Group LLP

(57) ABSTRACT

This antenna device comprises an antenna element disposed in a recess 2 on the exterior of a moving body, and a non-feeding element of which the center is disposed at a position higher than the horizontal plane in which the center of the antenna element is positioned in the recess. In the antenna device, furthermore, the moving body is a vehicle, and the recess may be provided in a roof 1 of the vehicle.

12 Claims, 5 Drawing Sheets

(56) References Cited

U.S. PATENT DOCUMENTS

| | | | | |
|---|---|---|---|---|
| 2021/0057806 | A1* | 2/2021 | Katsura | H01Q 3/26 |
| 2021/0091480 | A1* | 3/2021 | Sampo | H01Q 9/0407 |
| 2021/0218143 | A1 | 7/2021 | Huang et al. | |

FOREIGN PATENT DOCUMENTS

| | | | |
|---|---|---|---|
| JP | 2003-17916 | A | 1/2003 |
| JP | 2003-142919 | A | 5/2003 |
| JP | 2008-135931 | A | 6/2008 |
| JP | 2017-153036 | A | 8/2017 |
| WO | 2017/170906 | A1 | 10/2017 |
| WO | WO 2019150666 | A1 | 8/2019 |

OTHER PUBLICATIONS

International Search Report, dated Dec. 1, 2020, for International Application No. PCT/JP2020/036671, 6 pages. (with English translation).

* cited by examiner

ANTENNA DEVICE AND VEHICLE

TECHNICAL FIELD

The present disclosure relates to an antenna apparatus and a vehicle.

BACKGROUND ART

A technology of embedding an antenna apparatus in the roof of a vehicle to eliminate the protrusion of the antenna apparatus from the roof in order not to impair the aesthetic appearance of the vehicle has been developed.

For example, Patent Literature (hereinafter, referred to as "PTL") 1 discloses providing a recess in a roof (in other words, a recessed antenna accommodating portion), accommodating an antenna apparatus in the antenna accommodating portion, and closing the antenna accommodating portion with an accommodating lid being a part of the roof. With such a configuration, it is possible to eliminate a portion protruding outside the vehicle body to prevent the design of the vehicle from being impaired and the antenna from being broken.

CITATION LIST

Patent Literature

PTL 1

Japanese Patent Application Laid-Open No. 2003-017916

SUMMARY OF INVENTION

Technical Problem

However, with respect to the antenna apparatus disclosed in PTL 1, for example, the possibility that the performance (or characteristics) of the antenna apparatus may be deteriorated when the antenna apparatus is embedded in a vehicle roof has not been studied comprehensively.

The present disclosure provides, for example, a technique capable of suppressing deterioration in performance or characteristics of an antenna apparatus embedded in an exterior of a mobile entity.

Solution to Problem

An antenna apparatus in the present disclosure includes: an antenna element disposed in a recess in an exterior of a mobile entity; and a parasitic element whose center is disposed in the recess at a position higher than a horizontal plane in which a center of the antenna element is located.

It should be noted that general or specific embodiments may be implemented as a system, a method, an integrated circuit, a computer program, a storage medium, or any selective combination thereof.

Advantageous Effects of Invention

According to an aspect of the present disclosure, when the antenna apparatus is embedded in the exterior of the mobile entity, it is possible to suppress a decrease in performance or characteristics of the antenna apparatus.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, an embodiment will be described in detail with appropriate reference to the drawings. However, any unnecessarily detailed description may be omitted. For example, any detailed description of well-known matters and redundant descriptions on substantially the same configurations may be omitted. This is to avoid the unnecessary redundancy of the following description and to facilitate understanding of those skilled in the art.

It is to be noted that the accompanying drawings and the following description are provided to enable those skilled in the art to fully understand this disclosure, and are not intended to limit the claimed subject.

One Embodiment

Hereinafter, an embodiment of the present disclosure will be described with reference to FIGS. 1 to 5.

1. Configuration

Figure 1A:
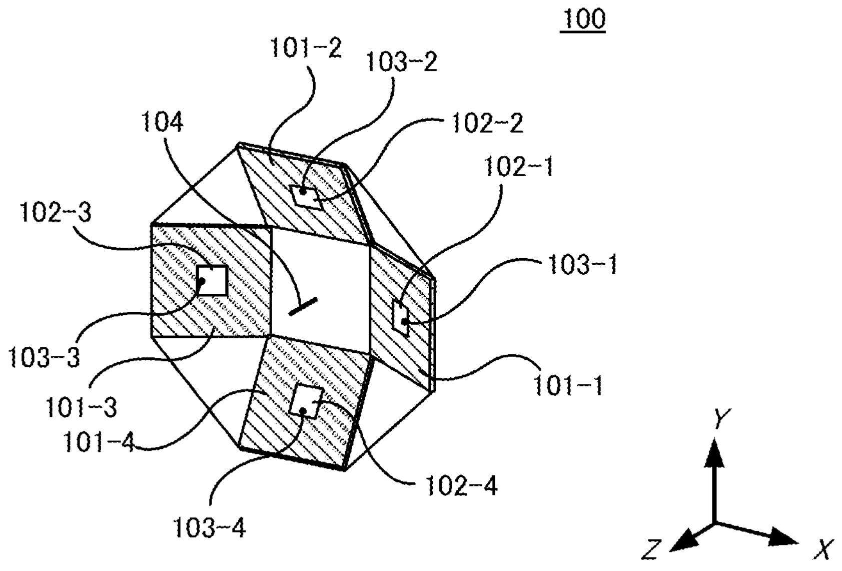
FIGS. 1A and 1B are a perspective view and a sectional view illustrating an example of a configuration of a vehicle roof embedded antenna apparatus according to an embodiment of the present disclosure.
Figure 1B:
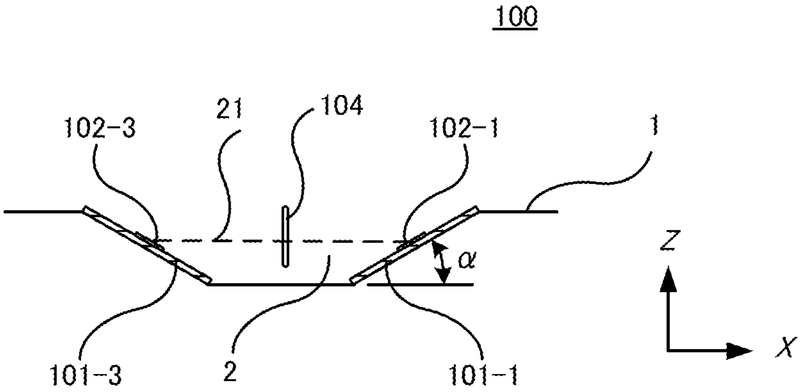

FIGS. 1A and 1B illustrate an example of a configuration of a vehicle roof embedded antenna apparatus according to an embodiment of the present disclosure. FIG. 1A is a perspective view and FIG. 1B is an XZ sectional view. In FIGS. 1 to 5, the X direction is a front-rear longitudinal direction of a vehicle (+X is front and −X is rear), the Y direction is a left-right direction along the width of the vehicle, and the Z direction is the vertical height direction of the vehicle. The vehicle in the present specification is an example of a mobile entity (or mobility) and may include an automobile, train, or small electric vehicle. Non-limiting examples of the small electric vehicle include two-wheeled standing electric scooter, electric wagon, electric cart, or electric baby cart.

As seen in FIGS. 1A and 1B, vehicle roof embedded antenna apparatus 100 is used in a state of being embedded in recess 2 in vehicle roof 1. Vehicle roof 1 may be a painted conductive metal or may be made of metal. Recess 2 in vehicle roof 1 illustrates a recess formed by a plurality of flat surfaces, but may also be formed by a combination of curved surfaces or of flat and curved surfaces. Recess 2 does not have to be a conductive metal.

Patch antenna elements 102-*k* (k=1, 2, 3, or 4) are disposed on the front surface of dielectric substrates 101-*k* (k=1, 2, 3, or 4), and GND (not illustrated) is formed on the back surface. Each of patch antenna elements 102-*k* (k=1, 2, 3, or 4) is a square conductor, one side of which is a half wavelength of an effective wavelength considering the wavelength shortening according to the dielectric constant of, for example, dielectric substrate 101-*k* (k=1, 2, 3, or 4). The GND is a square conductor, one side of which is larger than the half wavelength of the free space wavelength.

The patch antenna is a type of planar antenna and is also called a microstrip antenna.

For example, when the radio wave used is 28 GHz, it is sufficient that one side of patch antenna element 102-*k* (k=1, 2, 3, or 4) is about 2.5 mm, and one side of the GND is about 6 min or longer, and preferably about 10 mm.

Dielectric substrates 101-*k* (k=1, 2, 3, or 4) are, for example, arranged side by side on an inclined portion of recess 2 in vehicle roof 1 to surround the bottom center of recess 2 in vehicle roof 1 (in other words, radially around the bottom center). The inclined portion of recess 2 in vehicle roof 1 has tilt (inclination) angle α, for example, in the elevation direction with respect to the horizontal plane (XY plane) in which the bottom of recess 2 in vehicle roof 1 is located. Tilt angle α is 30 degrees as a non-limiting example. The patch antenna in individual dielectric substrate 101-*k* (k=1, 2, 3, or 4) may correspond to a sector antenna. In other words, four sector antennas may be configured by four patch antennas. Note that, the distance between patch antenna elements 102 forming the sector antennas facing each other in the inclined portion of recess 2 in vehicle roof 1 is, for example, about 18 mm. This distance is determined by a positional relationship between the elements including a below-described parasitic element in an attempt to obtain a desired directivity.

Feed points 103-*k* (k=1, 2, 3, or 4) are provided at positions where matching with radio circuitry can be obtained.

Parasitic element 104 is a conductor disposed at a substantially central axis of the four sector antennas (for example, disposed substantially equidistantly from two of the sector antennas facing each other). The center of parasitic element 104 is disposed at a position higher than horizontal plane 21 in which the centers of patch antenna elements 102-*k* (k=1, 2, 3, or 4) are located. Further, parasitic element 104 is disposed at a predetermined distance from the bottom surface of recess 2 in vehicle roof 1 without making contact with the bottom surface, and its length is set shorter than the half wavelength. Note that, parasitic element 104 may be integrated with a resin cover (not illustrated) covering recess 2 in vehicle roof 1, or may be fixed at somewhere in recess 2 in vehicle roof 1, for example, to the bottom at a predetermined distance from the bottom.

2. Operation

A description will be given below of an example of the operation of vehicle roof embedded antenna apparatus 100 configured as described above as compared with the operations of compared antenna apparatuses described in FIGS. 2 and 3.

Figure 2A:
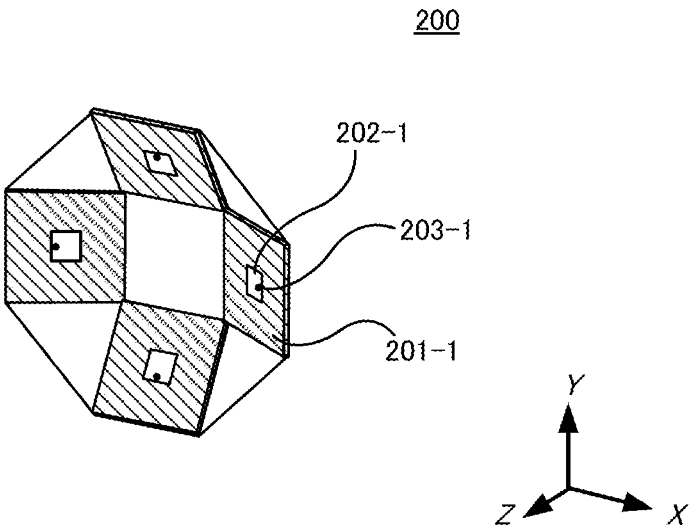
FIGS. 2A and 2B are a perspective view and a sectional view illustrating a configuration of a vehicle roof embedded antenna apparatus to be compared with the vehicle roof embedded antenna apparatus according to an embodiment of the present disclosure.
Figure 2B:
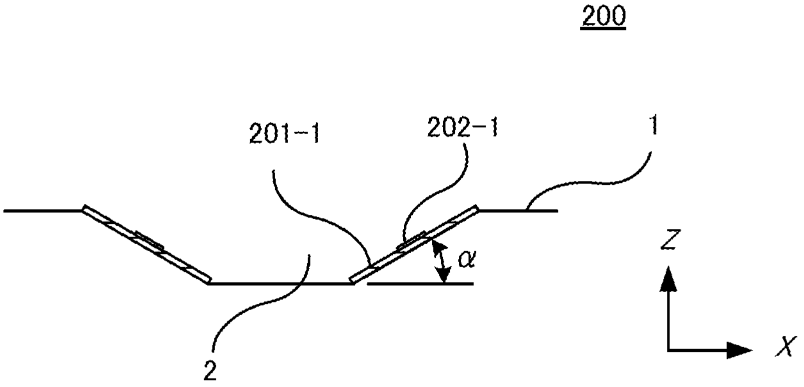

FIGS. 2A and 2B illustrate a configuration of vehicle roof embedded antenna apparatus 200 to be compared with vehicle roof embedded antenna apparatus 100 according to an embodiment of the present disclosure. FIGS. 2A and 2B are a perspective view and a sectional view of vehicle roof embedded antenna apparatus 200.

A difference between vehicle roof embedded antenna apparatus 100 illustrated in FIGS. 1A and 1B and vehicle roof embedded antenna apparatus 200 illustrated in FIGS. 2A and 2B is whether parasitic element 104 is present or absent. For example, vehicle roof embedded antenna apparatus 100 of FIGS. 1A and 1B is provided with parasitic element 104, whereas vehicle roof embedded antenna apparatus 200 of FIGS. 2A and 2B is not provided with any parasitic element.

FIGS. 2A and 2B illustrate four sector antennas composed of four sectors as in FIGS. 1A and 1B. The configuration of each of the sectors is the same, and thus, a description focusing on the sectors on the forward side will be given with reference to FIGS. 2A and 2B. Patch antenna element 202-1 is disposed on the front surface of dielectric substrate 201-1, GND (not illustrated) is formed on the back surface, and feed point 203-1 is also provided. Dielectric substrate 201-1 is disposed along recess 2 in vehicle roof 1, for example, at tilt (inclination) angle α=30 degrees in the elevation direction with respect to the horizontal plane (XY plane). The dielectric substrates are arranged radially, forming the four sector antennas.

Figure 3A:
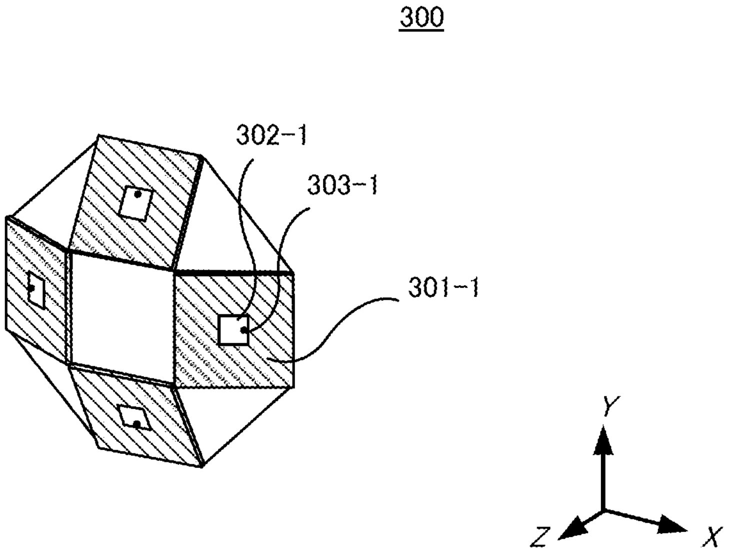
FIGS. 3A and 3B are a perspective view and a sectional view illustrating a configuration of a vehicle roof protruding antenna apparatus to be compared with the vehicle roof embedded antenna apparatus according to an embodiment of the present disclosure.
Figure 3B:
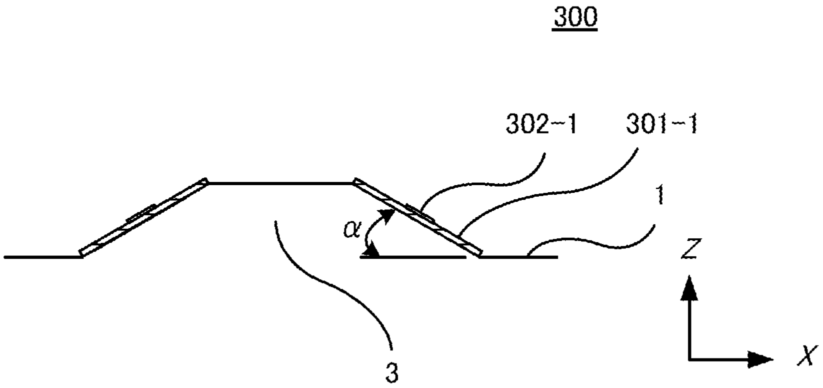

FIGS. 3A and 3B illustrate a configuration of vehicle roof protruding antenna apparatus 300 to be compared with vehicle roof embedded antenna apparatus 100 according to an embodiment of the present disclosure. FIGS. 3A and 3B are a perspective view and a sectional view of vehicle roof protruding antenna apparatus 300. Vehicle roof protruding antenna apparatus 300 has a configuration of four sector antennas along protrusion 3 from vehicle roof 1. Vehicle roof embedded antenna apparatus 100 illustrated in FIGS. 1A and 1B is an example in which antenna apparatus 100 is below the surface of vehicle roof 1 (in other words, not protruding from the roof surface). In contrast, regarding vehicle roof protruding antenna apparatus 300 illustrated in FIGS. 3A and 3B, antenna apparatus 300 is formed in a shape protruding on the surface of vehicle roof 1. Therefore, in vehicle roof protruding antenna apparatus 300 illustrated in FIGS. 3A and 3B, since antenna apparatus 300 protrudes from vehicle roof 1, the appearance of the vehicle is impaired.

FIGS. 3A and 3B illustrate four sector antennas composed of four sectors as in FIGS. 1A and 1B. The configuration of each of the sectors may be the same, and thus, a description focusing on the sectors on the forward side will be given with reference to FIGS. 3A and 3B. Patch antenna element 302-1 is disposed on the front surface of dielectric substrate 301-1, GND (not illustrated) is formed on the back surface, and feed point 303-1 is also provided. Dielectric substrate 301-1 is disposed along protrusion 3 on vehicle roof 1, for example, at tilt (inclination) angle α=30 degrees in the elevation direction with respect to the horizontal plane (XY plane). The dielectric substrates are arranged radially, forming the four sector antennas.

Figure 4A:
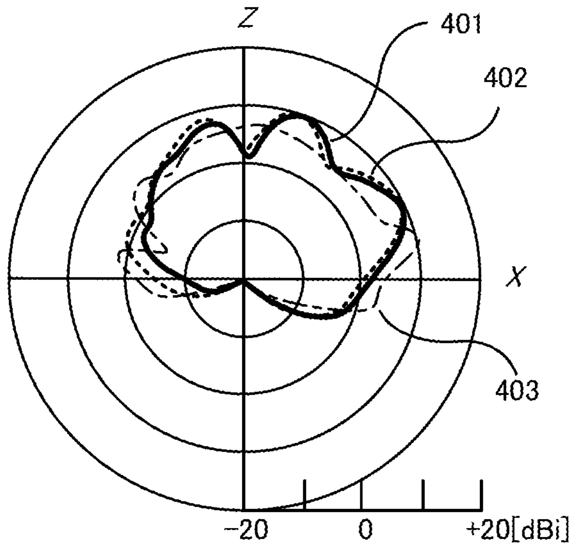
FIGS. 4A and 4B illustrate an example of radiation patterns of the vehicle roof embedded antenna apparatus according to an embodiment of the present disclosure.
Figure 4B:
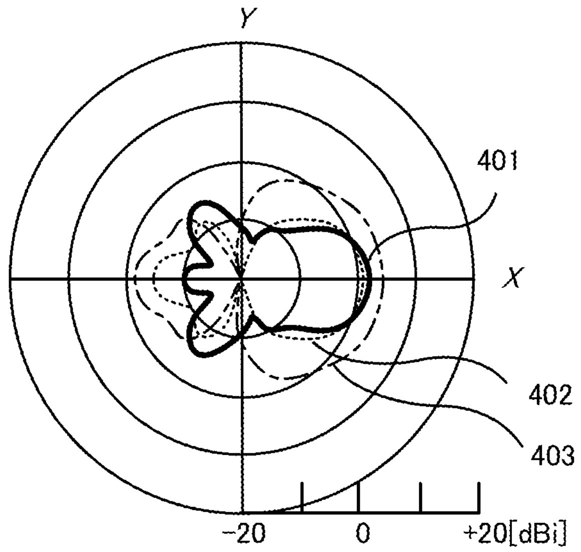

FIGS. 4A and 4B illustrate exemplary radiation patterns of antenna apparatuses 100, 200, and 300 described in FIGS. 1 to 3. FIG. 4A illustrates the radiation patterns of the antenna apparatuses in the XZ plane, and FIG. 4B illustrates the radiation patterns of the antenna apparatuses in the XY plane. In FIGS. 4A and 4B, the operation gains (sensitivities) are indicated in dBi.

Solid line 401 described in FIGS. 4A and 4B indicates the radiation pattern of patch antenna elements 102 of vehicle roof embedded antenna apparatus 100 described in FIGS. 1A and 1B. Dashed line 402 in FIGS. 4A and 4B indicates the radiation pattern of patch antenna elements 202 of vehicle roof embedded antenna apparatus 200 described in FIGS. 2A and 2B. One-dot chain line 403 in FIGS. 4A and 4B indicates the radiation pattern of patch antenna elements 302 of vehicle roof protruding antenna apparatus 300 described in FIGS. 3A and 3B.

Each of the radiation patterns indicates the characteristics exhibited during when the GND (not illustrated) is connected to vehicle roof 1, recess 2 or protrusion 3.

First, attention is paid to the gains in the +X direction (e.g., the forward direction of the vehicle) (Z=0) in FIG. 4A. The highest gain of the gains is of vehicle roof protruding antenna apparatus 300 described in FIGS. 3A and 3B (one-dot chain line 403). This is because vehicle roof protruding antenna apparatus 300 protrudes from vehicle roof 1 and the influence of vehicle roof 1 is thus relatively small. The lowest gain of the gains is of vehicle roof embedded antenna apparatus 200 having no parasitic element 104 described in FIGS. 2A and 2B (dashed line 402). This is because vehicle roof embedded antenna apparatus 200 is embedded in the vehicle roof and has no parasitic element, and the influence of vehicle roof 1 is thus the largest.

Vehicle roof embedded antenna apparatus 100 described in FIGS. 1A and 1B having parasitic element 104 (solid line 401) has a lower gain in the +X direction as compared to vehicle roof protruding antenna apparatus 300 (dashed line 403), but has a higher gain in the +X direction as compared to vehicle roof embedded antenna apparatus 200 having no parasitic element 104 (dashed line 402). The reason for this is that parasitic element 104 provided in vehicle roof embedded antenna apparatus 100 described in FIGS. 1A and 1B operates as a waveguide element. Note that, since parasitic element 104 is present substantially equidistantly as seen from all four patch antenna elements 102-*k* (k=1, 2, 3, or 4), parasitic element 104 operates similarly as the waveguide element for these four patch antenna elements.

Next, attention is paid to the gains in the horizontal plane (XY plane) illustrated in FIG. 4B. Here, +X is the forward direction of the vehicle, and Y indicates the width direction of the vehicle. Vehicle roof embedded antenna apparatus 100 having parasitic element 104 described in FIGS. 1A and 1B (solid line 401) has the narrowest half-value angle. This can be compensated for by increasing the number of sectors. For example, although the number of sectors of vehicle roof embedded antenna apparatus 100 described in FIGS. 1A and 1B is 4, compensation is possible by increasing the number of sectors to 5, 6, 7 or the like.

Figure 5:
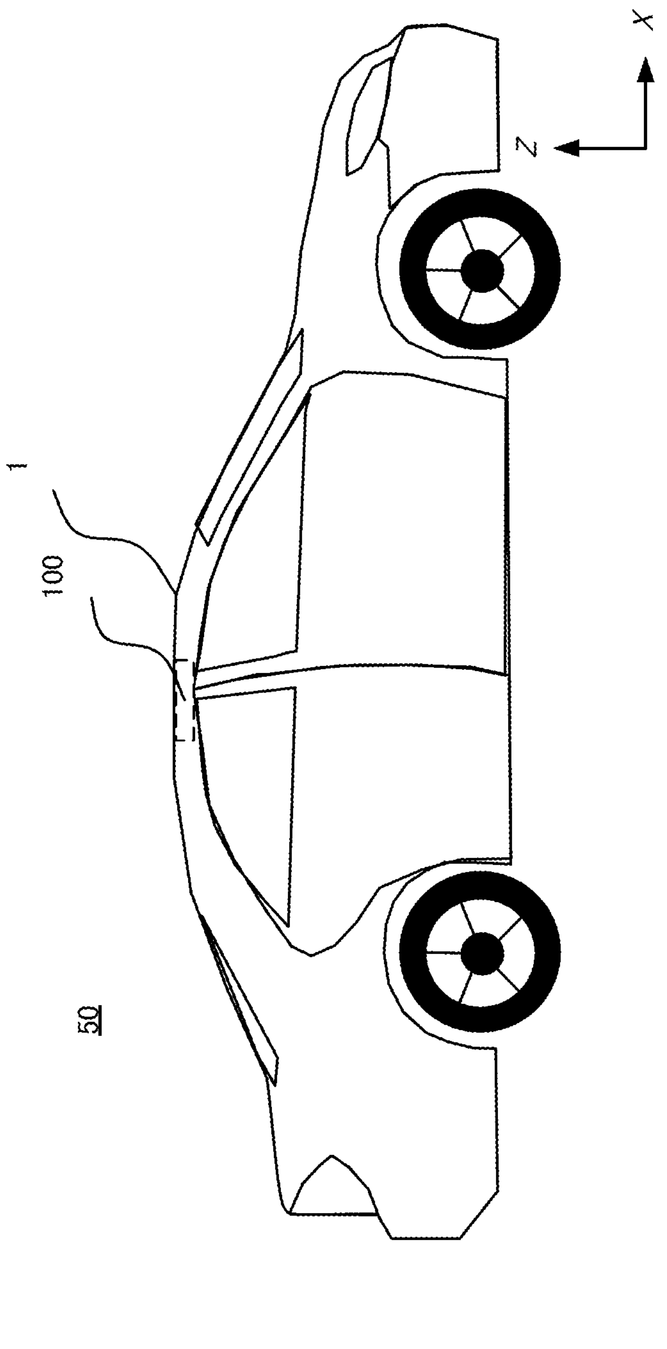
FIG. 5 is a side view illustrating an example of a vehicle incorporating the vehicle roof embedded antenna apparatus according to an embodiment of the present disclosure.

FIG. 5 illustrates vehicle roof embedded antenna apparatus 100 illustrated in FIGS. 1A and 1B as mounted in vehicle 50. One aspect in which vehicle roof embedded antenna apparatus 100 is attached to vehicle roof 1 is illustrated. It can be seen that vehicle roof embedded antenna apparatus 100 does not protrude from vehicle roof 1.

3. Effects and the Like

As described above, in the present embodiment, vehicle roof embedded antenna apparatus 100 is embedded in recess 2 in vehicle roof 1. The four sector antennas are configured to be disposed along recess 2 in vehicle roof 1 at tilt (inclination) angle α=30 degrees in the elevation direction with respect to the horizontal plane (XY plane) and arranged radially. Parasitic element 104 is disposed substantially at the central axis of the four sector antennas.

As described with reference to FIG. 5, with such a configuration, it is possible to prevent the appearance of the vehicle from being impaired, because there is no protrusion from the vehicle roof, and it is also possible to suppress the gain reduction in the horizontal plane even when the antenna apparatus is embedded in the vehicle roof.

Other Embodiments

The embodiment has been described above as an example of the art disclosed in the present application. However, the art in the present disclosure is not limited to this example, and can be applied to embodiments in which changes, substitutions, additions, omissions, and the like are made. It is also possible to combine constituent elements described in the above embodiment into a new embodiment.

Here, other embodiments will be exemplified below.

The embodiment has been described in relation to the case where the patch antennas configured with dielectric substrates 101-*k* (k=1, 2, 3, or 4) are used as an example of the antenna elements. Each of the antenna elements only has to transmit and receive electromagnetic waves at a desired frequency. For example, the antenna element may be a linear antenna, a loop antenna, or the like, or may also be a combination thereof. Thus, the antenna element is not limited to the patch antenna configured with a dielectric substrate. The patch antenna configured with the dielectric substrate has a merit of allowing easy and inexpensive realization of the antenna apparatus.

The embodiment has been described in relation to the case where tilt angle α is 30 degrees by way of example. Tilt angle α may be any angle as long as a desired radiation directivity is obtained. Therefore, tilt angle α is not limited to 30 degrees. Tilt angle α may be made larger as long as the parasitic element does not protrude from the vehicle roof. A larger tilt angle is desirable also in terms of suppressing a decrease in the horizontal plane gain.

The embodiment has been described in relation to the case where the number of sectors is 4. The number of sectors may be any number as long as communication can be established with a base station or an access point that emits radio waves to be received. Therefore, the number of sectors may be smaller or larger than 4, and is not limited to 4. Moreover, the spacing in an array is not limited. While it is desirable to increase the number of sectors in order to increase the coverage ratio in the horizontal plane, the sector configuration does not need to be employed and the number of antennas may be one when the aim is to cover a specific direction in the horizontal plane.

The embodiment has been described in relation to the case where the number of parasitic elements 104 is one, and parasitic element 104 is disposed at the central axis of the array of the sector antennas. While in terms of suppressing the gain reduction in the horizontal plane, it is preferable that parasitic element 104 be disposed at a position higher than the horizontal plane in which the antenna elements are located, the number of parasitic elements and the position of the arranged parasitic element in the horizontal plane only have to be a position for suppressing the gain reduction in the horizontal plane that could be caused due to the vehicle roof. Therefore, the number of parasitic elements is not limited to 1, and the arrangement is not limited to the central axis of the array of sector antennas. However, the configuration in which a single parasitic element is disposed at the central axis of the array of the sector antennas allows obtainment of the effect that is the same between the elements of the sector antennas in terms of suppressing the gain reduction in the horizontal plane. Thus, the configuration in which a single parasitic element is disposed at the central axis of the array of the sector antennas can be one effective candidate for a simple configuration.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other “things” in a network of an “Internet of Things (IoT)”.

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

It should be noted that, since the above-mentioned embodiments are for exemplifying the an in the present disclosure, various modifications, substitutions, additions, omissions, and the like can be performed within the scope of claims or the equivalent scope thereof <Summary of Present Disclosure>

An antenna apparatus in the present disclosure includes: an antenna element disposed in a recess in an exterior of a mobile entity; and a parasitic element whose center is disposed in the recess at a position higher than a horizontal plane in which a center of the antenna element is located.

In the antenna apparatus of the present disclosure, the mobile entity is a vehicle, and the recess is formed in a roof of the vehicle.

In the antenna apparatus of the present disclosure, the antenna element is a patch antenna configured using a dielectric substrate.

In the antenna apparatus of the present disclosure, the antenna element is tilted in an elevation direction with respect to the horizontal plane.

In the antenna apparatus of the present disclosure, a plurality of the antenna elements are disposed to surround a bottom center of the recess to form a sector configuration.

In the antenna apparatus of the present disclosure, the parasitic element is disposed at a central axis of the sector configuration.

In the antenna apparatus of the present disclosure, the parasitic element is rod-shaped.

In the antenna apparatus of the present disclosure, the parasitic element is attached to a back surface of a lid portion covering the recess.

A vehicle in the present disclosure includes: a recess formed in a roof; an antenna apparatus accommodated in the recess; and a lid portion that covers the recess accommodating the antenna apparatus, in which the antenna apparatus includes an antenna element disposed in the recess, and a parasitic element attached to a back surface of the lid portion or to the recess, and, when the recess is covered by the lid portion, a center of the parasitic element is located at a position higher than a horizontal plane in which a center of the antenna element is located.

The disclosure of Japanese Patent Application No. 2019-182438 dated Oct. 2, 2019 including the specification, drawings and abstract is incorporated herein by reference in its entirety.

INDUSTRIAL APPLICABILITY

The present disclosure is applicable to, for example, an antenna apparatus embedded in a roof of a vehicle.

REFERENCE SIGNS LIST

1 Vehicle roof
2 Recess
3 Protrusion
21 Horizontal plane
50 Vehicle
100 Vehicle roof embedded antenna apparatus
101-1 Dielectric substrate
101-2 Dielectric substrate
101-3 Dielectric substrate
101-4 Dielectric substrate
102-1 Patch antenna element

102-2 Patch antenna element
102-3 Patch antenna element
102-4 Patch antenna element
103-1 Feed point
103-2 Feed point
103-3 Feed point
103-4 Feed point
104 Parasitic element
200 Vehicle roof embedded antenna apparatus
201-1 Dielectric substrate
202-1 Patch antenna element
203-1 Feed point
300 Vehicle roof protruding antenna apparatus
301-1 Dielectric substrate
302-1 Patch antenna element
303-1 Feed point

The invention claimed is:

1. An antenna apparatus, comprising:
an antenna element disposed in a recess in an exterior of a mobile entity; and
a parasitic element whose center is disposed in the recess at a position higher than a horizontal plane in which a center of the antenna element is located, wherein
a plurality of the antenna elements are disposed to surround a bottom center of the recess to form a sector configuration, and
the parasitic element is disposed at a central axis of the sector configuration.

2. The antenna apparatus according to claim 1, wherein the mobile entity is a vehicle, and the recess is formed in a roof of the vehicle.

3. The antenna apparatus according to claim 1, wherein the antenna element is a patch antenna configured using a dielectric substrate.

4. The antenna apparatus according to claim 1, wherein the antenna element is tilted in an elevation direction with respect to the horizontal plane.

5. The antenna apparatus according to claim 1, wherein the parasitic element is rod-shaped.

6. The antenna apparatus according to claim 1, wherein the parasitic element is attached to a back surface of a lid portion covering the recess.

7. A vehicle, comprising:
a recess formed in a roof;
an antenna apparatus accommodated in the recess; and
a lid portion that covers the recess accommodating the antenna apparatus, wherein
the antenna apparatus includes:
an antenna element disposed in the recess, and
a parasitic element attached to a back surface of the lid portion or to the recess,
when the recess is covered by the lid portion, a center of the parasitic element is located at a position higher than a horizontal plane in which a center of the antenna element is located, and
the parasitic element is rod-shaped.

8. An antenna apparatus, comprising:
an antenna element disposed in a recess in an exterior of a mobile entity; and
a parasitic element whose center is disposed in the recess at a position higher than a horizontal plane in which a center of the antenna element is located, wherein
the parasitic element is rod-shaped.

9. The antenna apparatus according to claim 8, wherein the mobile entity is a vehicle, and the recess is formed in a roof of the vehicle.

10. The antenna apparatus according to claim 8, wherein the antenna element is a patch antenna configured using a dielectric substrate.

11. The antenna apparatus according to claim 8, wherein the antenna element is tilted in an elevation direction with respect to the horizontal plane.

12. The antenna apparatus according to claim 8, wherein the parasitic element is attached to a back surface of a lid portion covering the recess.

* * * * *